Dec. 21, 1943.    C. P. ASTROM ET AL    2,337,146
TRUCK SIDE FRAME FOR RAILROAD CARS
Filed July 15, 1942
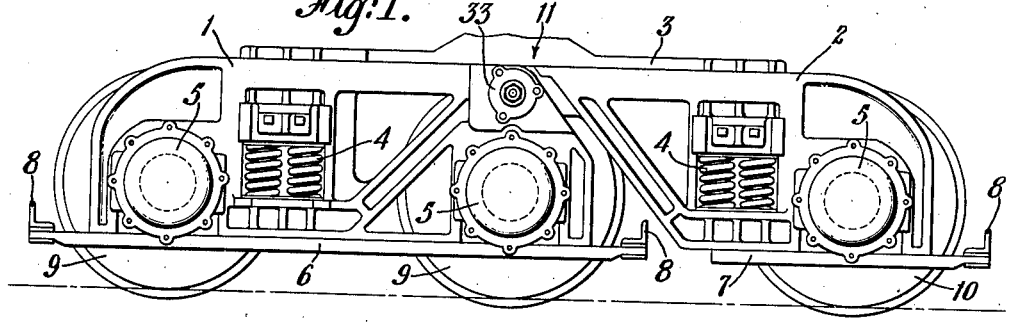
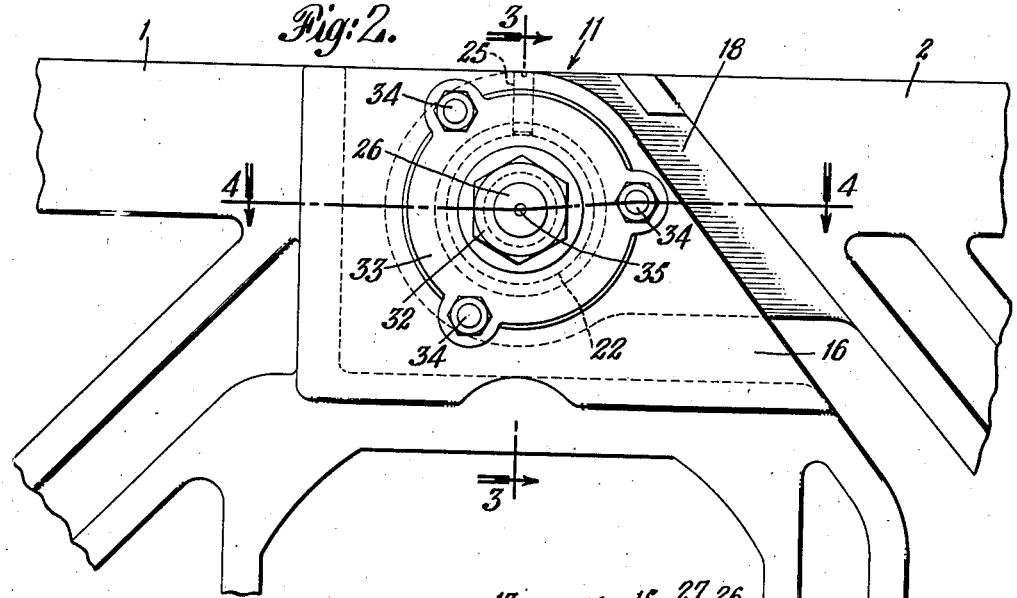
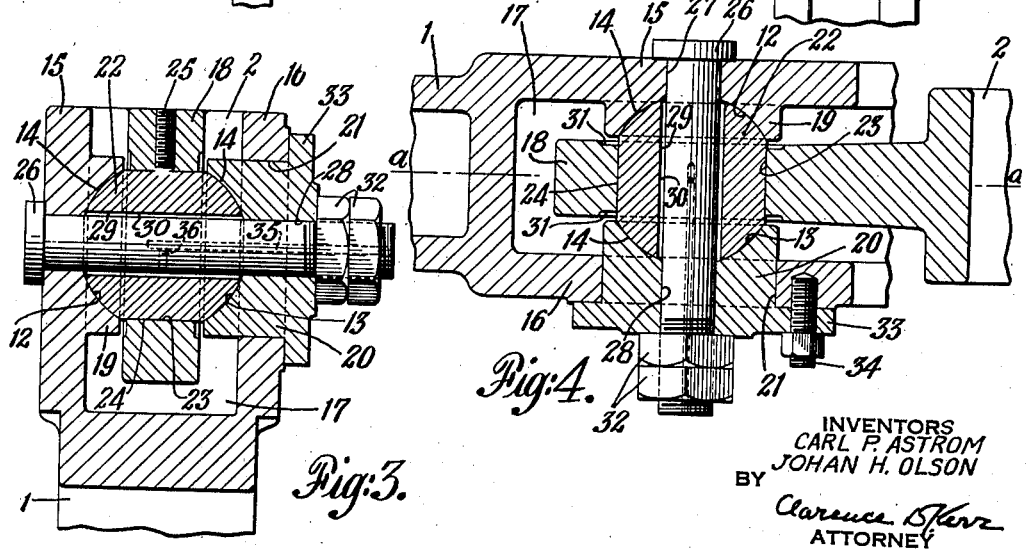
INVENTORS
CARL P. ASTROM
JOHAN H. OLSON
BY
ATTORNEY

UNITED STATES PATENT OFFICE 2,337,146

TRUCK SIDE FRAME FOR RAILROAD CARS

Carl P. Astrom, East Orange, N. J., and Johan H. Olson, Larchmont, N. Y., assignors to M. H. Treadwell Company, Inc., New York, N. Y., a corporation of New York Application July 15, 1942, Serial No. 450,948

6 Claims. (Cl. 105—195)

The invention relates to trucks for railroad cars, and more particularly to side frames for articulated trucks of the type designed to provide greater flexibility and thereby produce a more even performance when negotiating curves of small radii.

When an articulated side frame is constructed with two frame members, one of which has a ball-like projection at one side for engagement with a socket at one side of the other frame member, and these parallel members are connected by a bolt for pivotal movement about the ball and socket, it is necessary that the bolt be rather loose, both radially and lengthwise. If the bolt were tight, lateral displacement of the frame members—i. e. angling in a horizontal plane—would be too restricted. It is necessary to provide lateral flexibility, as well as vertical or up-and-down flexibility, to permit angling of the frame members with respect to one another when the truck negotiates a curved track section. When, however, the bolt of the construction described is loosened sufficiently to permit the desired lateral flexibility, the co-acting bearing surfaces of the pivotal connection between the frame members are not held in sufficiently tight engagement and have therefore only a line contact, and the bolt carries the entire load from the lateral thrust forces. Thus a condition is encountered which results in excessive wear of the coacting surfaces of the articulated members. It is an object of our invention to provide a side frame construction for articulated trucks with a universal joint which provides adequate lateral, as well as vertical flexibility, while at the same time avoiding undue looseness, and which carries vertical loads as well as lateral thrust loads and is provided with large bearing surfaces well lubricated to resist wear.

Another object of our invention is to provide a side frame having articulated frame members with co-acting spherical bearing surfaces designed to permit both vertical and lateral angling, the joint between the frame members being so constructed that the connecting bolt or other connecting means may have a tight fit with respect to the outside of the joint, as well as avoiding undue looseness between the co-acting surfaces.

Another defect of the ordinary hemi-spherical ball and socket joint as applied to articulated side frame construction is that although the center of bearing of the co-acting surfaces can be arranged at the longitudinal center-line of the side frame, the center of area of the side frame cross section at the joint is off-set from the longitudinal center-line. This produces a torque in the side frame, which is undesirable. It is a further object of our invention to provide an improved articulated joint of the class described, in which the center of area of each side frame cross section at the joint is located substantially at the longitudinal center-line of the frame, thus substantially reducing or eliminating torque in the frame.

Further objects of the invention are to provide an articulated side frame of the class described which is simple in construction, easy to manufacture, and which can be assembled with facility. Still other objects and advantages will appear as the description proceeds.

The invention finds particular application to trucks for hot metal cars. Such cars may have a load capacity of from 50 to 175 tons of hot metal. It is important that the horizontal thrust load be distributed as evenly as possible on all of the wheels by means of properly articulated trucks when negotiating curves, and that the wear at the points of articulation be reduced to a minimum. This of course is in line with the above-stated objects, and because of the particular advantages of the invention as applied to truck side frames for hot metal cars, we shall select such a truck as illustrative of a specific embodiment of our improved construction. It should be understood, however, that the invention is applicable also to trucks for other types of railroad cars, and that the particular truck which we shall describe is not limited to use on hot metal cars.

In the drawing,

Fig. 1 is a side elevational view of a six-wheel truck illustrating a preferred embodiment of the invention.

Fig. 2 is a detail elevational view of the universal joint of the articulated side frame forming a part of the truck shown in Fig. 1.

Figs. 3 and 4 are detail cross-sectional views of the articulated side frame construction, taken on the lines 3—3 and 4—4, respectively, of Fig. 2.

Referring more particularly to Fig. 1, the truck comprises side frames including the articulated frame members 1 and 2, bolster 3, spring clusters 4, journal boxes 5, longitudinal tie members 6 and 7, and cross tie journal box braces 8. The axles of the four wheels 9 are carried in bearings of the journal boxes associated with side frame members 1, the two remaining wheels 10 being associated with side frame members 2. This general construction of the truck is more or less conventional, and will be understood by those skilled in the railroad equipment art without further detailed description.

Each pair of side frame members 1 and 2 are pivotally connected together for relative vertical and lateral angling by a universal joint 11 which will now be described with particular reference to Figs. 2, 3 and 4 of the drawing. In its general arrangement, our improved side frame construction comprises the side frame member 1 having associated therewith concave substantially spherical bearing surfaces 12 and 13 located on opposite sides of the longitudinal center-line a—a of the frame (Fig. 4), and the complementary side frame member 2 having associated therewith convex substantially spherical bearing surfaces 14, 14 arranged for engagement with the bearing surfaces 12 and 13 associated with the side frame member 1. In our preferred construction of the interengaging portions of the side frame members 1 and 2, the frame member 1 is provided with jaws or opposed wall portions 15 and 16 forming between them a pocket 17 to receive a tongue 18 formed on the frame member 2. The inside of the wall portion 15 carries a boss 19 in which is formed the concave substantially spherical bearing surface 12, the opposed bearing surface 13 being formed on a member 20 which is mounted in an aperture 21 in its respective wall portion 16 so as to be removable therefrom. If desired, the bearing surface 12 may also be formed on a member which is removable from its respective wall portion 15, and in our preferred construction, it is essential that at least one of the opposed concave bearing surfaces be formed on a member which is removable from its respective wall portion, as is the bearing surface 13 of the construction illustrated. In this construction, the convex bearing surfaces 14, 14 are formed on a member 22 carried in a transversely extending aperture 23 in the tongue 18 of frame member 2. The member 22 preferably has a cylindrical portion 24, in which case the aforesaid aperture 23 will also be cylindrical, with projections at each side of the tongue 18 to provide the substantially spherical bearing surfaces 14, 14. The member 22 preferably has a press fit in the aperture 23, and a set-screw 25 (Fig. 3) provides additional means for holding the member 22 in place.

A fastening member such as the bolt 26 passes through the ball and socket joint formed by the construction described, the wall 15, removable member 20, and the ball member 22 being provided with apertures 27, 28 and 29, respectively, to receive the bolt. The bolt 26 preferably has a relatively close fit with the apertures 27, 28 in the member which forms the socket, but a substantial clearance 30 is provided between the bolt and the aperture 29 of the ball member 22 to permit lateral angling of the frame members 1 and 2 relative to one another and also to hold lubricating substance. The sides of the tongue 18 are recessed or counter-bored as at 31, 31 also for the purpose of providing clearance for angling—in this case, between the tongue and the inner edges of the boss 19 and member 20. Thus when the fastening member is tightened as by means of the nuts 32, adequate lateral as well as vertical flexibility between the side frame members 1 and 2 is provided, while at the same time undue looseness is avoided, so as to more effectively utilize the total wearing surfaces of the joint, and reduce excessive wear.

The removable socket member 20 is provided with a flange 33 engaging the outside of the wall 16 to limit its movement toward the opposing socket and prevent binding when the attaching means 26 is tightened. Stud bolts 34 passing through this flange into the wall portion 16 of frame member 1 hold the socket member 20 against turning in the frame.

Suitable means for lubricating the spherical bearing surfaces are provided. For this purpose, we have shown oil holes 35, 36 drilled in the bolt 26. A suitable fitting for the introduction of lubricant may be provided in conjunction with the end of the bolt. Grease forced through the holes 35 and 36 flows through the clearance space 30 between the bolt and the ball member 22, reaching the cooperating bearing surfaces 12, 14 and 13, 14.

In addition to the advantages previously mentioned, the construction we have described is very convenient to assemble, is easy to machine, and provides for ready replacement of parts subject to wear. The surfaces 12, 13, 14, 23, 24, 27 and 28 preferably are machined, as are also the surface 21 and the surface of the removable socket member 20 which engages the surface 21. Members 20 and 22 may be replaced in the event of wear.

It will be observed that the aperture 21 in the side frame member 1 is of sufficient size to permit the ball member 22 to be passed therethrough. In assembling the two frame members, the tongue 18 is inserted between the jaws or opposed wall portions 15 and 16 of the member 1. The ball member 22 is then inserted through the opening 21 and pressed into its proper position in the aperture 23, the bolt 26 inserted from the opposite side, the member 20 put in place and the nuts 32 tightened. The tongue 18 is centered on the member 22 and between the jaws 15, 16, and the set-screw 25 tightened as an additional security to hold it in this position.

The construction we have described provides a side frame member having a concave substantially spherical bearing surface 12 arranged at one side of the longitudinal centerline a—a of the frame, a wall 16 on said side frame member arranged opposite said bearing surface, a bearing member 20 arranged to be mounted on said side frame member and having a concave substantially spherical bearing surface 13 arranged in operative position at the other side of said longitudinal center-line opposing the first-named bearing surface 12, and a complementary side frame member having associated therewith convex substantially spherical bearing surfaces 14, 14 arranged for engagement with said concave bearing surfaces. At least one of the opposed concave bearing surfaces 12 and 13 are formed on a member 20 which is removable to permit assembly of the bearing member 22 with its respective side frame member 2 after the two side frame members have been brought together. The fastening member 26 has a loose fit in the ball 22 to permit angling of the frame members, and a tight fit with the socket, i. e., the jaws 15 and 16. It will be understood from the foregoing description that this construction provides adequate lateral, as well as vertical, flexibility while at the same time avoiding undue looseness and reducing excessive wear at the joint.

It will be observed, further, that in our construction the center of area of the side frame cross section at the joint is located substantially at the longitudinal center-line a—a of the frame, thus substantially reducing or eliminating torque in the frame.

The terms and expressions which we have employed are used in a descriptive and not a limiting sense, and we have no intention of excluding such equivalents of the invention described, or of portions thereof, as fall within the purview of the claims.

We claim:

1. In a side frame construction for articulated trucks, a side frame member having a concave substantially spherical bearing surface arranged at one side of the longitudinal center-line of the frame, an integral wall on said side frame member arranged opposite said bearing surface, a bearing member arranged to be mounted on said integral wall and having a concave substantially spherical bearing surface arranged in operative position at the other side of said longitudinal center-line opposing the first-named bearing surface, and a complementary side frame member having associated therewith a bearing member having convex substantially spherical bearing surfaces arranged for engagement with said concave bearing surfaces, the last-named bearing member being arranged to be assembled with its respective side frame member after the two side frame members have been brought together.

2. In a side frame construction for articulated trucks, a side frame member having associated therewith opposed concave substantially spherical bearing surfaces located on opposite sides of the longitudinal center-line of the frame, and a complementary side frame member having associated therewith a removable bearing member having substantially convex substantially spherical bearing surfaces arranged for engagement with said concave bearing surfaces, at least one of said opposed concave bearing surfaces being formed on a member which is removable to permit assembly of the first-named removable bearing member with its respective side frame member after the two side frame members have been brought together.

3. In a side frame having articulated frame members, a universal joint comprising a tongue on one frame member arranged to be received between opposed wall portions of a second frame member, a member secured to said tongue and having convex spherical surfaces for engagement with opposed complementary concave spherical surfaces associated with the opposed wall portions of the second frame member, at least one of said opposed concave bearing surfaces being formed on a member which is removable from its respective wall portion, and a fastening member extending through all of said members along an axis of said spherical surfaces.

4. In a side frame having articulated frame members, a ball and socket joint comprising a ball associated with a tongue on one frame member and a socket associated with opposed wall portions of a second frame member, the socket having a removable portion to permit the ball to pass through one of the opposed wall portions, and a fastening member passing through the ball and socket, the fastening member when tightened being fixed relative to the socket and clearance being provided between the fastening member and the ball.

5. In a side frame having articulated frame members, a ball and socket joint comprising a ball associated with a tongue on one frame member and a socket associated with opposed wall portions of a second frame member, the socket having a removable portion to permit the ball to pass through one of the opposed wall portions, a fastening member passing through the ball and socket, and means on the removable portion of the socket for limiting its movement toward the ball when the fastening member is tightened.

6. In a side frame having articulated frame members, a ball and socket joint comprising a ball associated with a tongue on one frame member and a socket associated with opposed wall portions of a second frame member, the socket having a removable portion to permit the ball to pass through one of the opposed wall portions, and a fastening member passing through the ball and socket, the fastening member having a loose fit in the ball to permit angling of the frame members, and a tight fit with the socket to exclude foreign material.

CARL P. ASTROM.
JOHAN H. OLSON.